(12) United States Patent
Zhuo et al.

(10) Patent No.: US 10,922,175 B2
(45) Date of Patent: Feb. 16, 2021

(54) METHOD, APPARATUS AND COMPUTER PROGRAM PRODUCT FOR FAILURE RECOVERY OF STORAGE SYSTEM

(71) Applicant: EMC IP Holding Company LLC, Hopkinton, MA (US)

(72) Inventors: Baote Zhuo, Beijing (CN); Geng Han, Beijing (CN); Jibing Dong, Beijing (CN); Jian Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 260 days.

(21) Appl. No.: 16/223,830

(22) Filed: Dec. 18, 2018

(65) Prior Publication Data

US 2019/0332476 A1    Oct. 31, 2019

(30) Foreign Application Priority Data

Apr. 28, 2018    (CN) .......................... 2018 1 0408962

(51) Int. Cl.
*G06F 11/00* (2006.01)
*G06F 11/10* (2006.01)
*G06F 11/07* (2006.01)
*G06F 11/20* (2006.01)
*G06F 11/34* (2006.01)

(52) U.S. Cl.
CPC ...... *G06F 11/1084* (2013.01); *G06F 11/0757* (2013.01); *G06F 11/2064* (2013.01); *G06F 11/2094* (2013.01); *G06F 11/3485* (2013.01); *G06F 2201/82* (2013.01)

(58) Field of Classification Search
CPC .............. G06F 11/004; G06F 11/1084; G06F 11/144413; G06F 11/008; G06F 11/0703; G06F 1/30; G06F 1/305
See application file for complete search history.

(56) References Cited

U.S. PATENT DOCUMENTS

| | | | | | |
|---|---|---|---|---|---|
| 5,317,752 | A | * | 5/1994 | Jewett | G06F 1/12 714/14 |
| 5,675,816 | A | * | 10/1997 | Hiyoshi | G11B 19/20 369/243 |
| 7,275,179 | B1 | * | 9/2007 | Coatney | G06F 11/1084 714/6.32 |
| 7,672,072 | B1 | * | 3/2010 | Boyle | G11B 19/046 360/31 |
| 8,307,159 | B2 | * | 11/2012 | McKean | G06F 11/2094 711/114 |

(Continued)

*Primary Examiner* — Bryce P Bonzo
*Assistant Examiner* — Jeison C Arcos
(74) *Attorney, Agent, or Firm* — BainwoodHuang

(57) ABSTRACT

Techniques are directed to failure recovery of a storage system. In accordance with certain techniques, in response to detecting that a disk group of a memory system failed, failure duration of the disk group is recorded. If the failure duration does not reach a predetermined ready time limit and the disk group is in a degraded state, the disk group is maintained in a degraded but not ready state. The predetermined ready time limit is shorter than a logic unit number debounce time limit to avoid a data unavailable event. With such techniques, the possibility of occurrence of a data loss event may be reduced significantly while avoiding a data unavailable event.

23 Claims, 13 Drawing Sheets

(56) References Cited

U.S. PATENT DOCUMENTS

| | | | | |
|---|---|---|---|---|
| 8,689,040 | B2* | 4/2014 | Kidney | G06F 11/1088 |
| | | | | 714/6.1 |
| 8,782,465 | B1* | 7/2014 | Foley | G06F 11/008 |
| | | | | 714/6.22 |
| 9,507,887 | B1 | 11/2016 | Wang et al. | |
| 9,641,615 | B1 | 5/2017 | Robins et al. | |
| 9,836,363 | B2* | 12/2017 | Nosov | H04L 69/40 |
| 10,162,548 | B2 | 12/2018 | Robins et al. | |
| 10,310,943 | B2* | 6/2019 | Huang | G06F 3/067 |
| 2001/0039632 | A1* | 11/2001 | MacLaren | G11C 29/846 |
| | | | | 714/6.2 |
| 2003/0088805 | A1* | 5/2003 | Majni | G06F 11/328 |
| | | | | 714/5.1 |
| 2004/0068670 | A1* | 4/2004 | Suzuki | G06F 1/30 |
| | | | | 713/300 |
| 2004/0205381 | A1* | 10/2004 | Sakai | G11B 27/32 |
| | | | | 714/6.1 |
| 2005/0081087 | A1* | 4/2005 | Yagisawa | G06F 11/008 |
| | | | | 714/6.22 |
| 2005/0216664 | A1* | 9/2005 | Taninaka | H04L 41/082 |
| | | | | 711/114 |
| 2006/0064416 | A1* | 3/2006 | Sim-Tang | G06F 16/174 |
| 2006/0161805 | A1* | 7/2006 | Tseng | G06F 11/1092 |
| | | | | 714/6.22 |
| 2007/0268847 | A1* | 11/2007 | Schiffer | G05B 19/0426 |
| | | | | 370/282 |
| 2008/0141072 | A1* | 6/2008 | Kalgren | G01D 3/08 |
| | | | | 714/33 |
| 2008/0189578 | A1* | 8/2008 | Raghuraman | G06F 11/004 |
| | | | | 714/47.1 |
| 2010/0106907 | A1* | 4/2010 | Noguchi | G06F 11/2069 |
| | | | | 711/114 |
| 2010/0122115 | A1* | 5/2010 | Olster | G06F 11/2094 |
| | | | | 714/6.32 |
| 2015/0095095 | A1* | 4/2015 | Sorensen | G06Q 10/0631 |
| | | | | 705/7.26 |
| 2019/0220372 | A1* | 7/2019 | Kang | G06F 12/0804 |

* cited by examiner

METHOD, APPARATUS AND COMPUTER PROGRAM PRODUCT FOR FAILURE RECOVERY OF STORAGE SYSTEM

FIELD

Embodiments of the present disclosure generally relate to the field of data storage, and more specifically, to a method, apparatus and computer program product for failure recovery of a storage system.

BACKGROUND

A storage system may be built on one or more physical storage devices for providing capability of data storage. Redundant array of independent disks (RAID) is a storage technology for achieving data redundancy and improving access speed by combining a plurality of disks.

According to RAID technology, a plurality of independent disks are utilized to form a disk group with a large capacity and a technology called as striping is employed to allocate data input/output (I/O) loads evenly to multiple physical disks. In other words, a piece of contiguous data block is divided into several smaller blocks evenly that are respectively stored on a plurality of disks which logically belong to the same storage device. Therefore, by storing and reading data concurrently on a plurality of disks, the throughput and access speed of the storage system can be improved. In addition, in the RAID technology, the stability of the system can be improved by providing error tolerance function through data verification. Many RAID modes are provided with a relatively complete verification/recovery mechanism, and some even directly use mirror backup of each other.

Upon occurrence of hardware failure such as power failure or removal of disk, RAID group might be broken. After the hardware failure is cleared, it is necessary to power on the disks again. During the process of failure recovery, due to hardware limitation, the time and sequence for powering on respective disks in the disk group cannot be determined beforehand and this mainly lies in the following two reasons. First, disks in the RAID group may be located in different machines and the powering times of different machines are very likely to be different; second, in order to avoid power glitch, the machine will generally not power its internal disks on at the same time, which means that even if located within the same machine, disks will not be powered on at the same time. Therefore, after the hardware failure is cleared, the time for each disk drive to be online again is different. In this way, the RAID group generally needs to wait for a predetermined period of time for all the disk drives to recover. However, when this waiting time expires and not all the disks are online yet, the host will report a data unavailable (DU) event to the user if no operation can be made on the disk. To this end, it will generally force the disk group to be accessed in a degraded state shortly (usually after 5 seconds) after two disks are online.

However, executing I/O operation in a degraded state may cause a data loss event. This is because hardware failure may cause incomplete reading and writing, which means data inconsistency between the disks. However, when the inconsistent data is read and written under the degraded state, not all the disks are online, and thus, data of a disk that is not yet online cannot be recovered, which may render the disk in a data lost (DL) mode. Moreover, even if it subsequently becomes the state that all the disks are online, the data cannot be recovered either. Therefore, the disk that is last online will still be in the DL mode. This means that even if the user does not access the last online disk, when all the disks are recovered, a DL event still exists, which would give the user a bad experience.

SUMMARY

Embodiments of the present disclosure provide a technical solution for failure recovery of a storage system.

In a first aspect of the present disclosure, there is provided a method for failure recovery of a storage system. The method includes: in response to detecting that a disk group of a memory system failed, recording failure duration of the disk group; and maintaining the disk group in a degraded but not ready state if the failure duration does not reach a predetermined ready time limit and the disk group is in a degraded state, wherein the predetermined ready time limit is shorter than a logic unit number debounce time limit to avoid a data unavailable event.

In a second aspect of the present disclosure, there is provided an apparatus for failure recovery of a storage system. The apparatus includes a processor and a memory coupled to the processor, the memory having instructions stored therein which, when executed by the processor, cause the apparatus to perform acts. The acts include: in response to detecting that a disk group of a memory system failed, recording failure duration of the disk group. The acts further include: maintaining the disk group in a degraded but not ready state if the failure duration does not reach a predetermined ready time limit and the disk group is in a degraded state, wherein the predetermined ready time limit is shorter than a logic unit number debounce time limit to avoid a data unavailable event.

In a third aspect of the present disclosure, there is provided a computer program product being tangibly stored on a computer readable medium and comprising machine executable instructions which, when executed, cause a machine to perform the method according to the first aspect.

This Summary is provided to introduce a selection of concepts in a simplified form that are further described below in the Detailed Description. This Summary is not intended to identify key features or essential features of the claimed subject matter, nor is it intended to limit the scope of the claimed subject matter.

BRIEF DESCRIPTION OF THE DRAWINGS

The above and other objectives, features, and advantages of the present disclosure will become more apparent through the detailed description of example embodiments of the present disclosure with reference to the accompanying drawings, where the same reference symbols generally represent the like elements in example embodiments of the present disclosure.

DETAILED DESCRIPTION OF EMBODIMENTS

Figure 1:
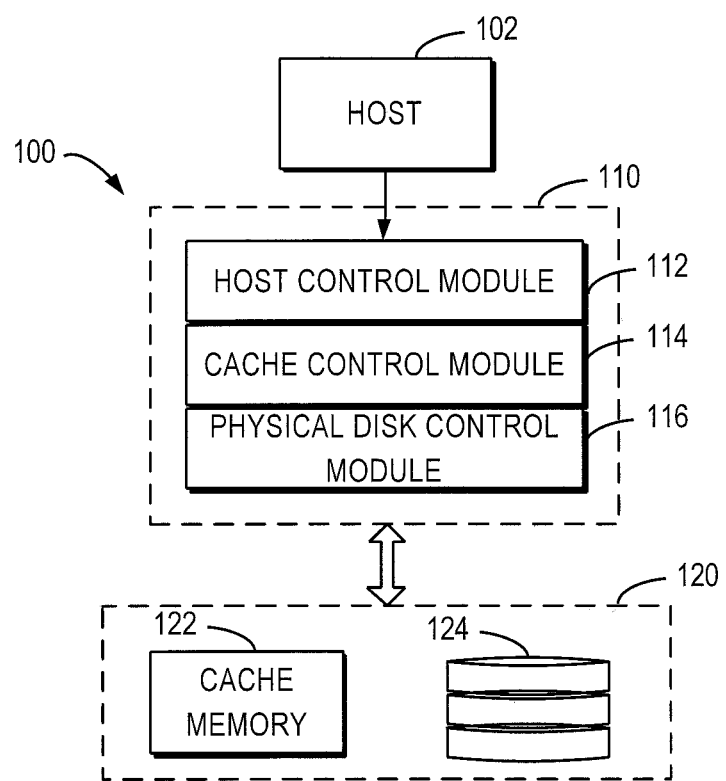
FIG. 1 is a schematic diagram illustrating an example environment in which embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to various example embodiments illustrated in the drawings. Although preferred embodiments of present disclosure are displayed in the drawings, it is to be understood that these embodiments are described only to enable those skilled in the art to better understand and further implement the present disclosure, and not intended to limit the scope disclosed herein in any manner.

As used herein, the term "includes/comprises" or the like and their derivatives are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least one other embodiment." Terms "a first", "a second" and others can denote different or identical objects. The following text may also contain other explicit or implicit definitions.

First, reference is made to FIG. 1 which is a schematic diagram illustrating a storage system 100 in which embodiments of the present disclosure may be implemented. The storage system 100 includes a physical storage device group 120 for providing data storage capability. The physical storage device group 120 includes a cache memory 122 for data cache and disk devices 124 for persistent storage of data. Generally, the access speed of the cache memory 122 is greater than that of the disk devices 124. The storage system 100 may utilize multiple storage technologies to provide the data storage capability.

In some embodiments, examples of the cache memory 122 include a memory having a high access speed, such as a cache, a random access memory (RAM), and a dynamic random access memory (DRAM). Examples of the disk devices 124 may include a redundant array of independent disks (RAID) or other disk devices.

To manage data storage of the physical storage space, the storage system 100 further includes a storage controller 110. Typically, the storage system 100 adopts a layered control model. As shown in FIG. 1, under the layered control model, the storage controller 110 may have multiple layers of control modules, including a host control module 112, a cache control module 114 and a physical disk control module 116. These control modules provide a functionality of layered control.

To facilitate understanding of the layered control model of the storage system 100, the working mechanism of the controller 110 is described in an example using the RAID technology. The physical disk control module 116 displays the RAID logic unit number (LUN) to the cache control module 114. The physical disk control module 116 controls the storage space of the disk devices 124. The cache control module 114 controls the cache space of the cache memory 122 to display the cache volume to the host control module 112. The host control module 112 manages the logic storage pool and displays the pool LUN to the host 102.

During operation, the host 102, such as an application on the host 102, transmits a user write request to the host control module 112 to request data to be written into the storage system 100. In response to the received write request from the user, the host control module 112 may probably generate a plurality of write requests for the cache control module 114. For example, if the user write request of the host 102 requires a large amount of data to be written into a plurality of discrete segments of RAID LUN created by the disk devices 124, the host control module 112 would transmit a write request for each segment to the cache control module 114.

The cache control module 114 and the cache memory 122 operate in a write-back mode, which means that after receiving a write request, the cache control module 114 first caches data to be written by the write request into the cache memory 122 and then releases the data of the write request(s) into the disk device 124. The cache control module 114 may, upon completion of data caching, transmit a completion instruction of the write request to the host control module 112, so as to achieve a quick response to the user's write request. The physical disk control module 116 is used for controlling the actual write to the disk devices 124.

During implementing of I/O request, an I/O tracking structure (IOTS) and a sub-IO tracking structure (SIOTS) will be utilized. IOTS is an interface with the RAID library. Upon reception of an I/O request, an RAID object will initialize IOTS and transmit it to the RAID library, which will further activate a plurality of SIOTSs. The SIOTS is a main working unit inside the RAID library and most of state machines inside the RAID library implement RAID algorithms based on SIOTS. Each SIOTS will use one or more field replaceable unit tracking structures (FRUS), and a field replaceable unit (FRU) represents, for instance, one or more disks or drives, while an FRUS represents an I/O of the disk or drive.

The IOTS may be divided into a plurality of SIOTSs based on several criteria. For example, when the RAID group is operated in the degraded mode, the logic block address (LBA) range of the SIOTS should be of a unit size (64 k) and aligned with the unit. When RAID is operated in an optimized mode, the LBA range of the SIOTS should ensure that the parity check range is continuous. Moreover, it should be also noted that an I/O transmitted to a driver cannot be greater than 1 MB within one SIOTS.

Figure 2:
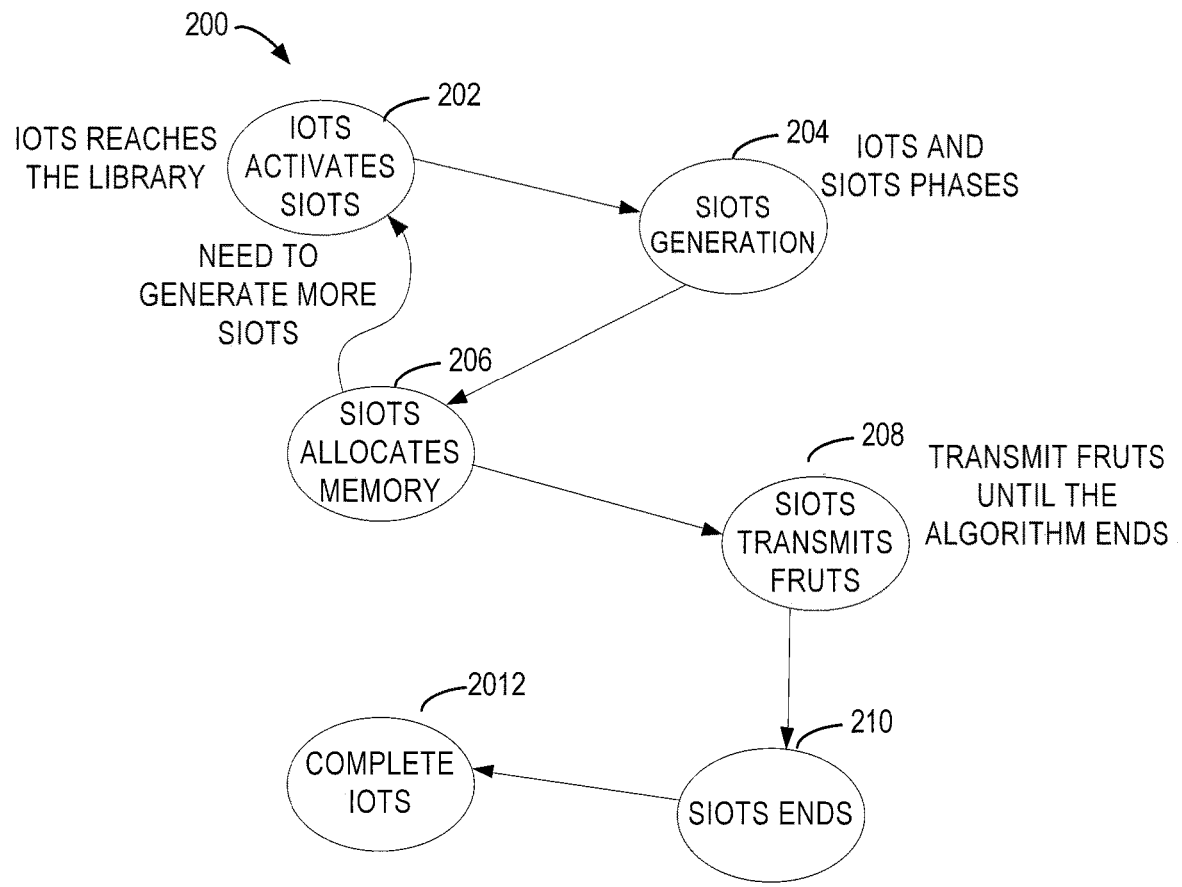
FIG. 2 is a flowchart illustrating a process of performing an I/O request with I/O tracking structure (IOTS) and sub-IOTS (SIOTS) in the environment shown in FIG. 1.

Hereinafter, for illustration purposes, reference will be made to FIG. 2 to describe an execution process of an I/O request. As shown in FIG. 2, when an RAID object receives an I/O request and is ready to implement the I/O request, it transmits the IOTS to the RAID library. After the IOTS reaches the RAID library, the RAID library activates the IOTS which further activates SIOTS (202). Then SIOTS is generated (204), and the memory (206) required for implementing the operation is allocated. The steps of activating SIOTS (202), generating SIOTS (204) and allocating a memory (206) for the SIOTS will be repeated until the above operations have been implemented for all the SIOTSs. Then, the RAID algorithm is executed for each SIOTS and FRUS is transmitted till all the SIOTS algorithms have been implemented (208). After the algorithms have been implemented, the SIOTS enters the completed state (210). After SIOTS is completed, IOTS enters the completed state (212). Thus, the implementation of I/O request is completed.

It is to be understood that although illustrated as different modules hereinabove, the host control module 112, the cache control module 114 and the physical disk control module 116 may be implemented by one or more processors, controllers, microprocessors having processing capability or a computing device containing these devices. In some examples, the cache control module 114 may be further integrated with the cache memory 122 to provide a device having caching and control capabilities at the same time. Although not shown, in some embodiments, the storage system 100 may further include another storage controller as a mirror of the storage controller 100 to provide data consistency, security and data recovery capability. In some examples, the storage system 100 may further use a multi-core storage mechanism for data storage and management.

As described above, upon occurrence of hardware failure, such as power failure or removal of the disk, RAID group will be broken down. After the hardware failure is cleared, it is necessary to power on the disk again. However, during the process of failure recovery, due to hardware limitation, the time and sequence for powering on respective disks in the disk group cannot be determined beforehand. Therefore, after the hardware failure is cleared, the time for each disk drive to be online again is different. When the predetermined time period (generally 80 s) expires, and still not all the disks are online, the host will report a DU event to the user if no operation can be made on the disk. To this end, it will generally allow the disk to be accessed in a degraded state shortly after two disks are online. When I/O operation is performed under the degraded state, a data loss event might be caused if it involves accessing inconsistent data, which will bring the user bad experience.

To illustrate the idea of the present disclosure more clearly, reference will be made to FIGS. 2 and 3 first to describe the technical solution in the prior art.

Figure 3:
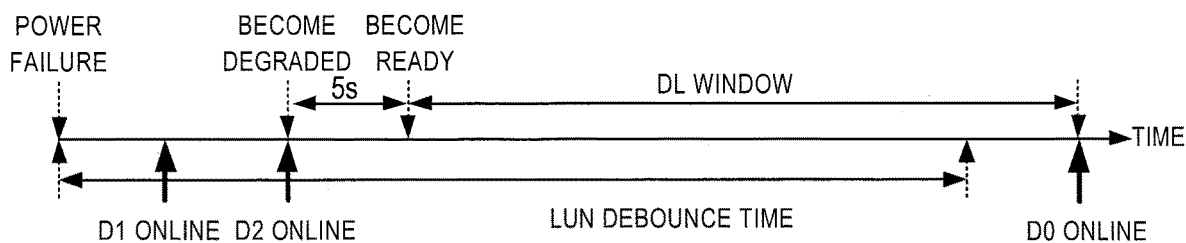
FIG. 3 is a time chart illustrating a failure recovery process in accordance with the prior art.

FIG. 3 is a time chart illustrating a failure recovery process in accordance with the prior art, wherein an RAID group includes three disks D0, D1 and D2. As shown in FIG. 3, after a power failure occurs, the disk D1 is online first and then disk D2 becomes online, and thereafter, the host enters the degraded state immediately. If D0 is still not online within 5 s after the host enters the degraded state, the host is forced to enter a degraded operation ready state. The degraded operation ready state may be also called as a ready state in which operation may be performed only with two disks in the absence of the third disk D0. The LUN debounce time is generally a time limitation associated with DU event and it is typically 80 s. If the third disk D0 is still not online when the LUN debounce time expires, then the host will realize that the third disk is not online and report a DU event to the user. If the third disk D0 is online after 80 s, the host will re-bind the RAID group and begins to operate in a normal state which may also be referred to as an optimized state. However, as the operation had been being performed in the degraded mode between the ready state and the time when third disk D0 is online, the time window therebetween is a DL window in which data loss might occur.

For example, upon occurrence of hardware failure, the user's I/O operation may be not completed totally yet and therefore, a case of incomplete write might occur. However, when a hardware failure occurs, even if it is a power failure, such data being written will still be stored in the cache since the storage system generally has a power failure protection function. After the failure is cleared, the cache will continue to write the user data not completed before the power failure (referred to as "dirty data" in the present disclosure).

Writing data anew of the cache is performed mainly for the following two reasons. One reason is that after the failure is cleared, write I/O will notify the RAID group that an error of inconsistency exists on the stripe and while serving the I/O operation, the RAID group may verify the stripe and correct the inconsistency. The other reason is that the memory resource in the cache is limited and thus, the cache needs to flush data to release the storage space for serving the I/O request. This typical technology in use may be referred to as background verify avoidance (BVA). With BVA, the RAID group does not need to verify the whole RAID group but only needs to verify the stripe when the cache transmits BVA I/O. However, as mentioned above, the RAID group might be in the degraded operation ready state, and if the RAID group is operated in degradation mode and the write of some stripes is incomplete, BVA will cause data loss. For illustration purposes, reference will be made to FIG. 3 to describe a scenario in which DL may exist.

Figure 4:
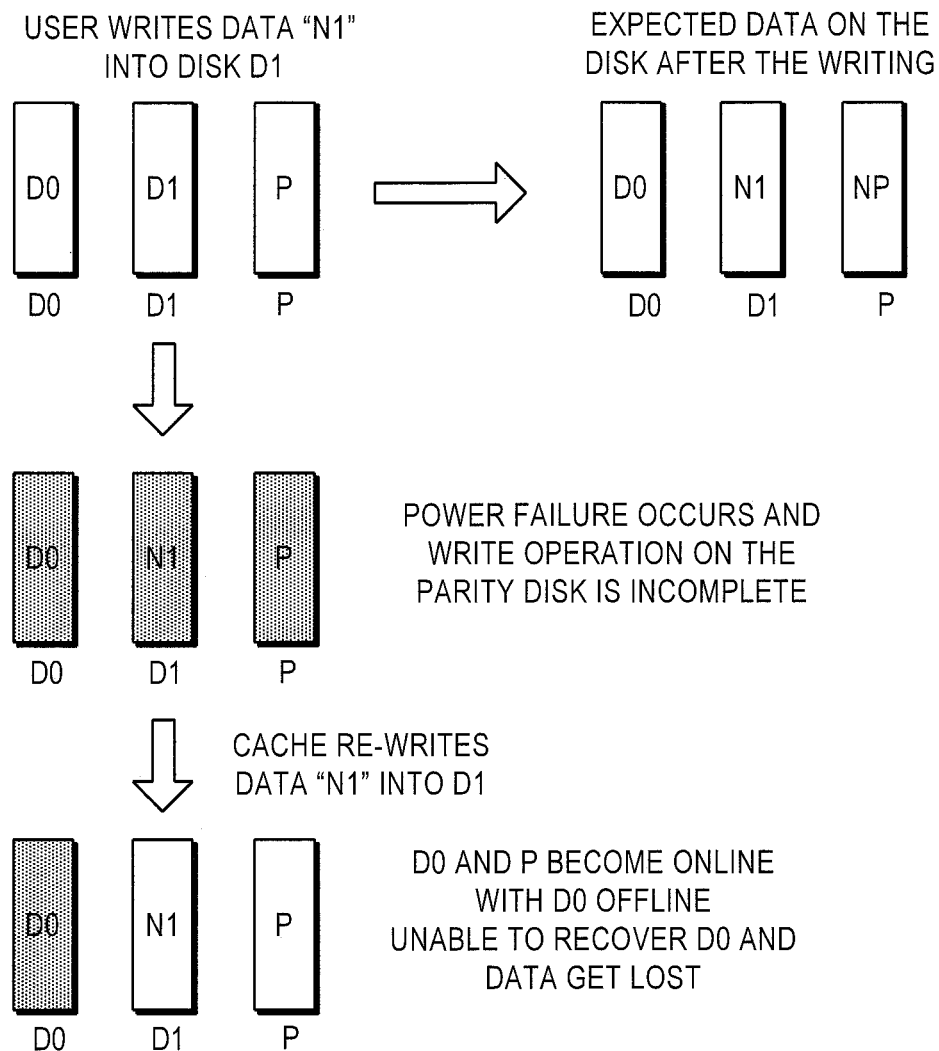
FIG. 4 is a schematic diagram illustrating a scenario in which a data loss event occurs.

As shown in FIG. 4, when the user writes data "NI" to the disk D1, under normal conditions, the RAID group will update the disk D1 and the parity disk P (see figure on the right corner). However, if a power failure occurs when the disk D1 is being written but the parity check disk is not yet updated, incomplete write will occur on the stripe. In other words, disk D1 already contains new data but the parity check disk P still contains old data. Then, as the user's I/O operation is not yet completed, the cache will store data in the storage area. During the process of failure recovery, the disks become online one after another, wherein disk D1 and parity disk P are online first while disk D0 is online later. After the disk D1 and the parity disk P are online, RAID group will soon be in the degraded operation ready state and operated in the degraded mode. Then, the cache immediately re-writes the data into the RAID group. When the disk D1 and the parity disk P both contain new data or old data, and the data are consistent, then the RAID group may recover data on disk 0 correctly based on the data on the two disks.

However, if the disk D1 has new data while the parity disk O contains old data, the recovered data are invalid. Then, the RAID group finds that data on the disk D1 and parity disk P are inconsistent and it is in the degraded mode, and then it will write new data into the disk D1. Meanwhile, as data on the disk D1 and parity disk P is inconsistent, it is impossible to recover data on the disk 0, and thus, the disk D0 is constructed in the data loss mode. After several seconds, all failures are cleared and disk D0 is online. However, as data in D0 cannot be recovered, disk D0 is still constructed in the data loss mode. It can be seen that in such a case, disk D0 still has data loss although the user does not touch disk D0 and all the hardware failures have been cleared.

Therefore, when the RAID is allowed to operate in the degraded state, the RAID group might still receive a DL event if there exists an incomplete write, even though the hardware failure is cleared. On the other hand, if, when the hardware failure is recovered, the RAID group waits until all the disks are online and then enters the ready state to avoid DL event, the LUN debounce timer is very likely to expire and thus the host will receive a DU event. However, in either case, it will bring bad experience to the user.

To this end, embodiments of the present disclosure provide a solution for failure recovery of a storage system. In this solution, the failure duration of the disk group is recorded and the disk group is maintained in the degraded but not ready state when the failure duration does not reach a predetermined degraded operation ready time limit and the disk group is in the degraded state. Besides, the predetermined ready time limit is set to be shorter than the LUN debounce time limit to avoid the DU event. By setting the above degraded operation ready time limit, it is possible to postpone the time when the host enters the degraded operation ready state while avoiding DU event, which may reduce the span of the DL window and in turn reduce the possibility of occurrence of the DL event.

Hereinafter, reference will be made to FIGS. 5-15 to describe embodiments of the present disclosure. However, it is to be indicated that the drawings and the embodiments shown therein are provided for illustration purposes, and the present disclosure is not limited to details shown therein. Instead, without departing from the ideas and spirits of the present disclosure, various changes may be implemented or made without these details.

Figure 5:
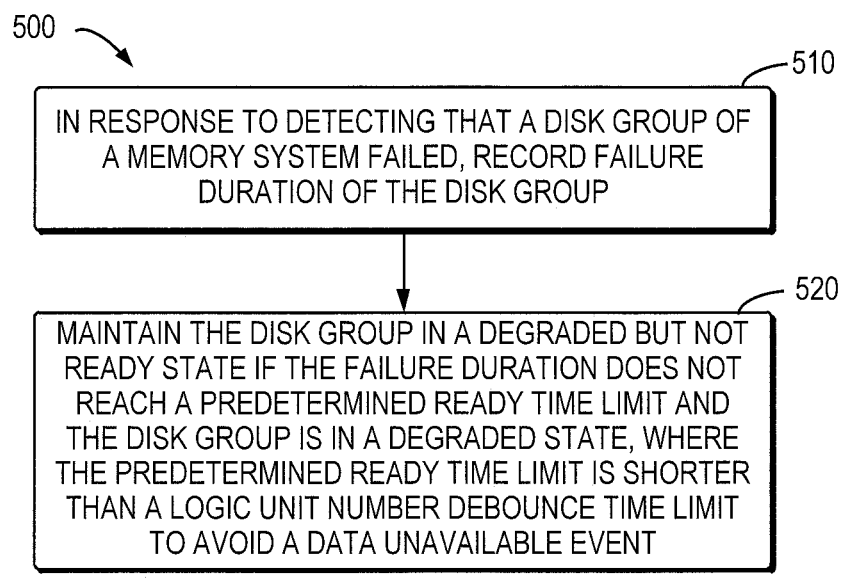
FIG. 5 is a flowchart illustrating a method for failure recovery of a storage system in accordance with an embodiment of the present disclosure.

FIG. 5 is a flowchart illustrating a method 500 for failure recovery of a storage system in accordance with embodiments of the present disclosure. Operations of the method 500 or at least a part thereof may be implemented by a controlling device/controller of the storage system, particularly by a controlling module in the controller that is used for managing a storage device with a lower access speed.

In step 510, in response to detecting that the disk group of the memory system failed, the failure duration of the disk group is recorded. In an embodiment of the present disclosure, it is possible to start a failure duration timer to clock the failure duration. In accordance with another embodiment of the present disclosure, a failure timestamp may be started. The RAID may check the timestamp at a predetermined time interval (for instance, 2 s, 3 s or other proper time interval) to determine the failure duration.

In step 520, if the failure duration does not reach a predetermined ready time limit and the disk group is in a degraded state, the disk group is maintained in the degraded but not ready state.

Different from the solution in which the host is forced to enter the degraded operation ready state 5s after entering the degraded state to allow the RAID group to operate in the degraded mode, in embodiments of the present disclosure, the RAID group will not enter the degraded operation ready state before the failure duration reaches the predetermined ready time limit. The predetermined ready time limit is set to be shorter than the LUN debounce time limit to ensure that DU event will not occur.

The LUN debounce time is a time monitored at a high level, while after the RAID group enters the degraded operation state, it is necessary to notify it to the high level. Therefore, to ensure that DU event will not be caused because of the delay of the notification, it may set a certain lead time margin. In addition, it may also consider setting the difference between the predetermined ready time limit and the logic unit number debounce time limit as small as possible so as to postpone the degraded operation ready state as much as possible.

In an embodiment of the present disclosure, the predetermined ready time limit is shorter than the LUN debounce time limit by 5 to 25 s, preferably 10 s. When the LUN debounce time limit is 80 s, the predetermined ready time limit may be 55-75 s, preferably 70 s.

In an embodiment of the present disclosure, before the failure duration timer reaches the predetermined ready time limit, the RAID group is maintained in a degraded but not ready state. According to another embodiment of the present disclosure, it is possible to check the timestamp for failure timing regularly at a predetermined interval (for example, 2 s, 3 s or other proper time interval) to determine if the failure duration reaches the predetermined ready time limit. If no, the RAID group will not be forced to enter the degraded state but wait for the next check moment.

Figure 6:
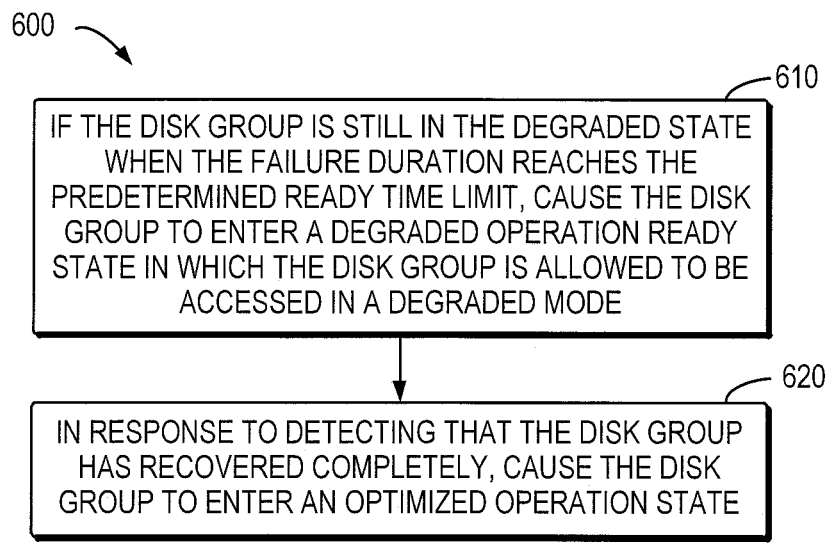
FIG. 6 is a flowchart illustrating a method for failure recovery of a storage system in accordance with another embodiment of the present disclosure.

FIG. 6 is a flowchart illustrating a method 600 for failure recovery of a storage system in accordance with another embodiment of the present disclosure. The method 600 may be an example possibly operated in combination with the method shown in FIG. 5. These operations or at least a part thereof may be implemented by the controlling device/controller of the storage system, particularly by a controlling module in the controller for managing a storage device with a lower access speed.

As shown in FIG. 6, in step 610, if the disk group is still in the degraded state when the failure duration reaches the predetermined ready time limit, the disk group is caused to enter the degraded operation ready state in which it is allowed to perform an accessing operation to the disk group in the degraded mode. That is to say, only when the failure duration reaches the predetermined ready time limit and there remains a disk still not online, the disk group will enter the degraded operation ready state.

In step 620, in response to detecting that the disk group has been recovered completely, the disk group is caused to enter the optimized operation state. During the whole process of disk group recovery, any time when it is detected that the remaining last disk become online, the disk group will exit the degraded operation ready state and enter the normal operation or optimized operation state, and start to utilize the entire disk group for performing accessing operation.

Figure 7:
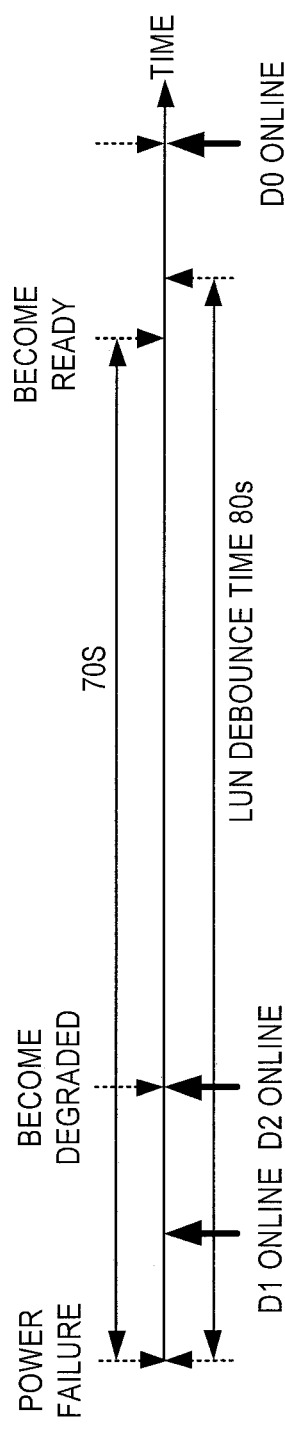
FIG. 7 is a time chart illustrating a failure recovery process in accordance with an embodiment of the present disclosure.

For illustration purposes, FIG. 7 illustrates a time chart of a failure recovery process in accordance with an embodiment of the present disclosure. As can be seen clearly from FIG. 7, the difference from the time chart shown in FIG. 3 lies in that it is unlike the solution of the prior art in which the RAID group is forced to enter the degraded operation ready mode at the end of a predetermined time period (5 s) after it enters the degraded state; instead, it enters the degraded operation ready state only if the third disk D0 is still not online when the predetermined ready time limit (70 s) expires after the power failure occurs. Thus, compared with the solution in FIG. 3, the time window for DL is obviously limited and reduced.

Figure 8:
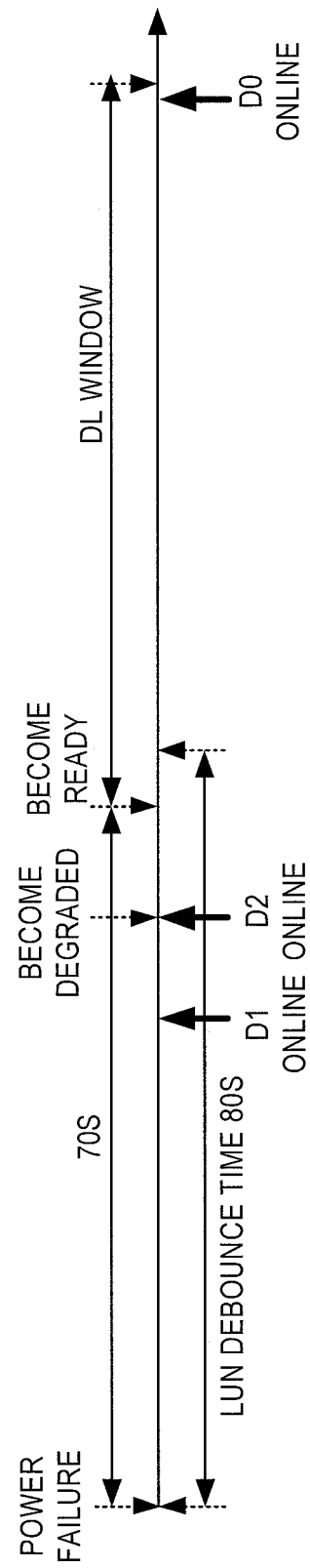
FIG. 8 is a time chart illustrating a DL window during failure recovery in accordance with an embodiment of the present disclosure.

FIG. 8 is a time chart illustrating a DL window during a period of failure recovery in accordance with another embodiment of the present disclosure. Different from the illustration in FIG. 7, the third disk D0 in the RAID group is not successfully online before the LUN debounce time expires. As shown in FIG. 8, in such a case, the DL window will open when the RAID group turns into the degraded operation ready state and will not close until the third disk D0 is online. Therefore, although the DL time window is reduced through the solution described above, DL time window is still wide at this time.

In view of this, it is further proposed in the present disclosure to set an I/O operation waiting time length limit within which the execution of I/O operation involving inconsistent data may be suspended, and no DL event will be returned unless the I/O operation waiting time length limit is reached and the third disk is still not online yet, so as to avoid the occurrence of DL event as much as possible. Hereinafter, reference will be made to FIGS. 9-12 to further describe the solution. However, it is to be noted that although the solution is described in the following as implemented on the basis of the preceding solution described with reference to FIGS. 5-7, the present disclosure is not limited thereto but can be implemented separately independent of the preceding solution. In the following, a detailed description will be made with reference to FIG. 9.

Figure 9:
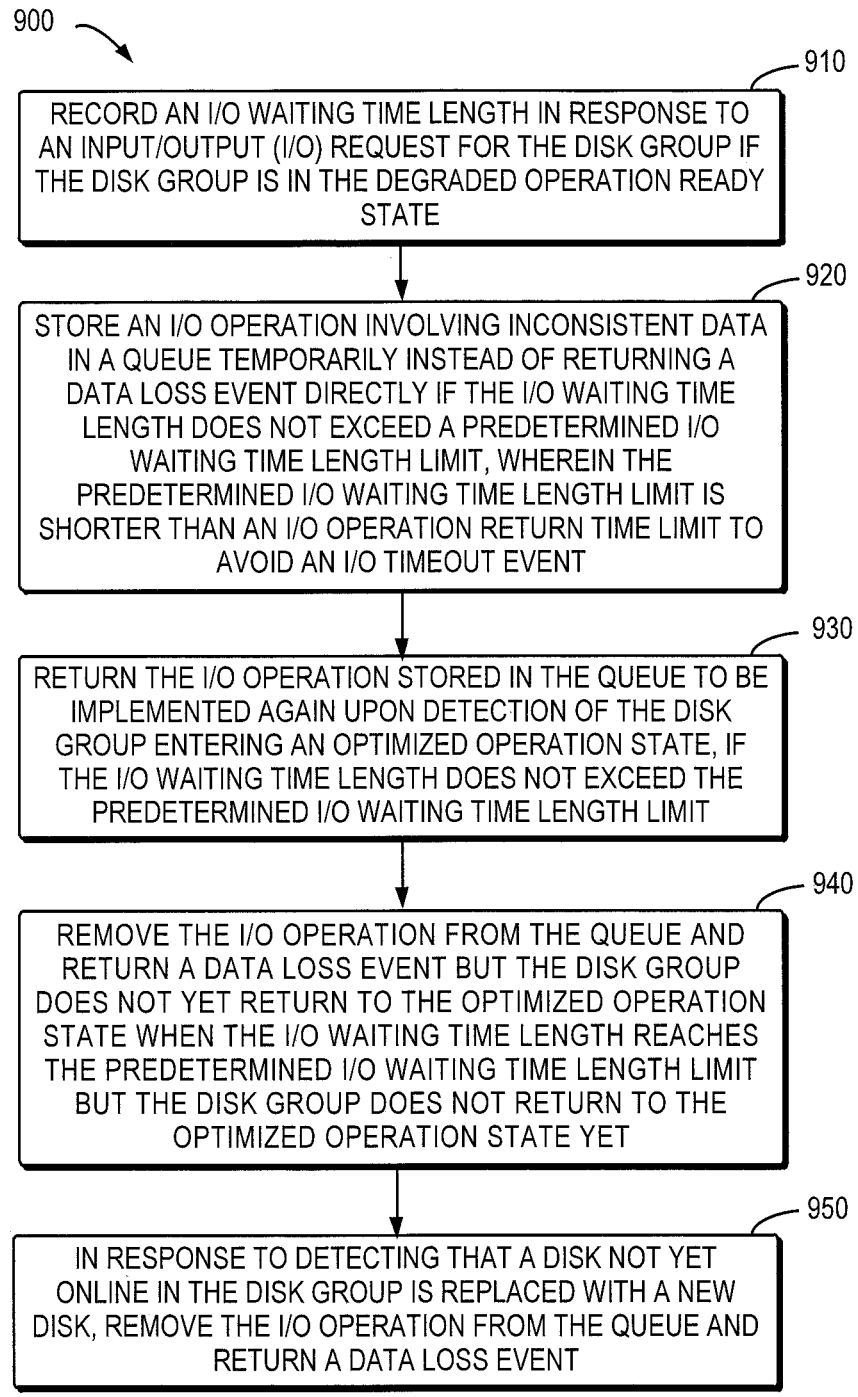
FIG. 9 is a flowchart illustrating a method for failure recovery of a storage system in accordance with a further embodiment of the present disclosure.

FIG. 9 is a flowchart illustrating a method 900 for failure recovery of a storage system in accordance with an embodiment of the present disclosure. The operations of method 900 or at least a part thereof may be implemented by the controlling device/controller of the storage system, particularly by a controlling module in the controller for managing a storage device with a lower access speed.

As shown in FIG. 9, in step 910, if the disk group is in the degraded operation ready state, in response to the I/O request for the disk group, the I/O waiting time length may be recorded. In an embodiment of the present disclosure, an I/O waiting time length timer may be started to clock the I/O waiting time length. In another embodiment of the present disclosure, an I/O waiting time length timestamp may be started. The RAID may check the timestamp at a predetermined interval (for example, 2 s, 3 s or other proper time interval) to determine the I/O waiting time length.

Next, in step 920, when the I/O waiting time length does not exceed the predetermined I/O waiting time length limit, the I/O operation involving inconsistent data is stored in the queue temporarily, instead of returning a data loss event directly. The predetermined I/O waiting time length limit is shorter than the I/O operation return time limit to avoid the I/O timeout event. Therefore, in embodiments of the present disclosure, as long as the I/O waiting time length does not exceed the predetermined I/O waiting time length limit, the DL event may not be returned for the time being. Thus, when the third disk is online before the predetermined I/O waiting time length limit, the I/O operation involving inconsistent data can be executed again without returning any DL event.

In addition, the predetermined I/O waiting time length limit is set to be shorter than the I/O operation return time limit. This is because the predetermined I/O waiting time length limit is the time limit of the I/O return operation result. If I/O operation result is not returned when the limit is exceeded, an I/O timeout event will be triggered. Furthermore, as it will take some time to notify the high level, a certain lead time margin may be configured to ensure that I/O timeout event will not occur at the high level. Moreover, it may also consider setting the difference between the predetermined I/O waiting time length limit and the I/O operation return time limit as small as possible, so as to postpone the issuing of DL event as much as possible.

In an embodiment according to the present disclosure, the predetermined I/O waiting time length limit is shorter than the I/O operation return time limit by 5 s to 25 s, preferably 10 s. When the I/O operation return time limit is limited as 80 s, the predetermined I/O waiting time length limit may be 55 to 75 s, preferably 70 s.

Furthermore, as shown in FIG. 9, in another embodiment of the present disclosure, in step 930, the I/O operation stored in the queue is returned to be re-executed upon the detection of the disk group entering an optimized operation state, if the I/O waiting time length does not exceed the predetermined I/O waiting time length limit. In this way, by delaying I/O operations involving inconsistent operation until all the disks are online, the occurrence of DL event may be avoided.

In-step 940, when the I/O waiting time length reaches the predetermined I/O waiting time length limit but the disk group does not return to the optimized operation state yet, the data loss event is returned to the high level. In this case, the third disk is still offline till the predetermined I/O waiting time length limit; if no DL is returned at this time, an I/O timeout event will be triggered. Hence, the I/O operation stored in the queue is removed therefrom and a data loss event is returned.

In step 950, in response to detecting that a disk not online in the disk group is replaced with a new disk, the I/O operation is removed from the queue and a data loss event is returned. In this case, it will be impossible to avoid the DL event since a new disk is already used to replace a disk that remains not online. Therefore, the I/O operation is removed from the queue directly and a DL event is returned.

Figure 10:
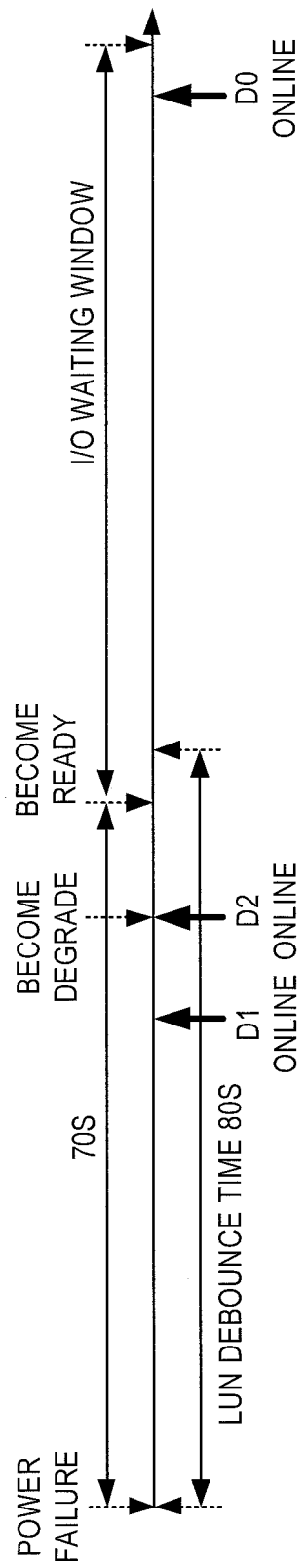
FIG. 10 is a time chart illustrating a failure recovery process in accordance with an embodiment of the present disclosure.

FIG. 10 is a time chart illustrating a failure recovery process in accordance with an embodiment of the present disclosure, where a third disk D0 in the RAID group still remains offline till the LUN debounce time expires. As shown in FIG. 10, in this embodiment, when the failure duration reaches a limit of 70 s, the third disk D0 in the RAID group is still not online. Then, it enters the degraded operation ready state to implement BVA write. The disk group enters I/O waiting window in which even if an I/O operation for inconsistent data exists, a DL event will not be returned directly. Instead, the DL event will be returned only when the I/O waiting time window closes and D0 is still not online. In the case shown in FIG. 10, the third disk D0 become online before the I/O waiting time window closes, and then the I/O operation involving inconsistent data may be executed again in the optimized operation mode and no DL event will be returned.

Besides, for illustration purposes, reference will be made to FIGS. 11-13 to describe example processes for processing BVA write, data read and I/O wait monitoring during the period of failure recovery according to embodiments of the present disclosure.

Figure 11:
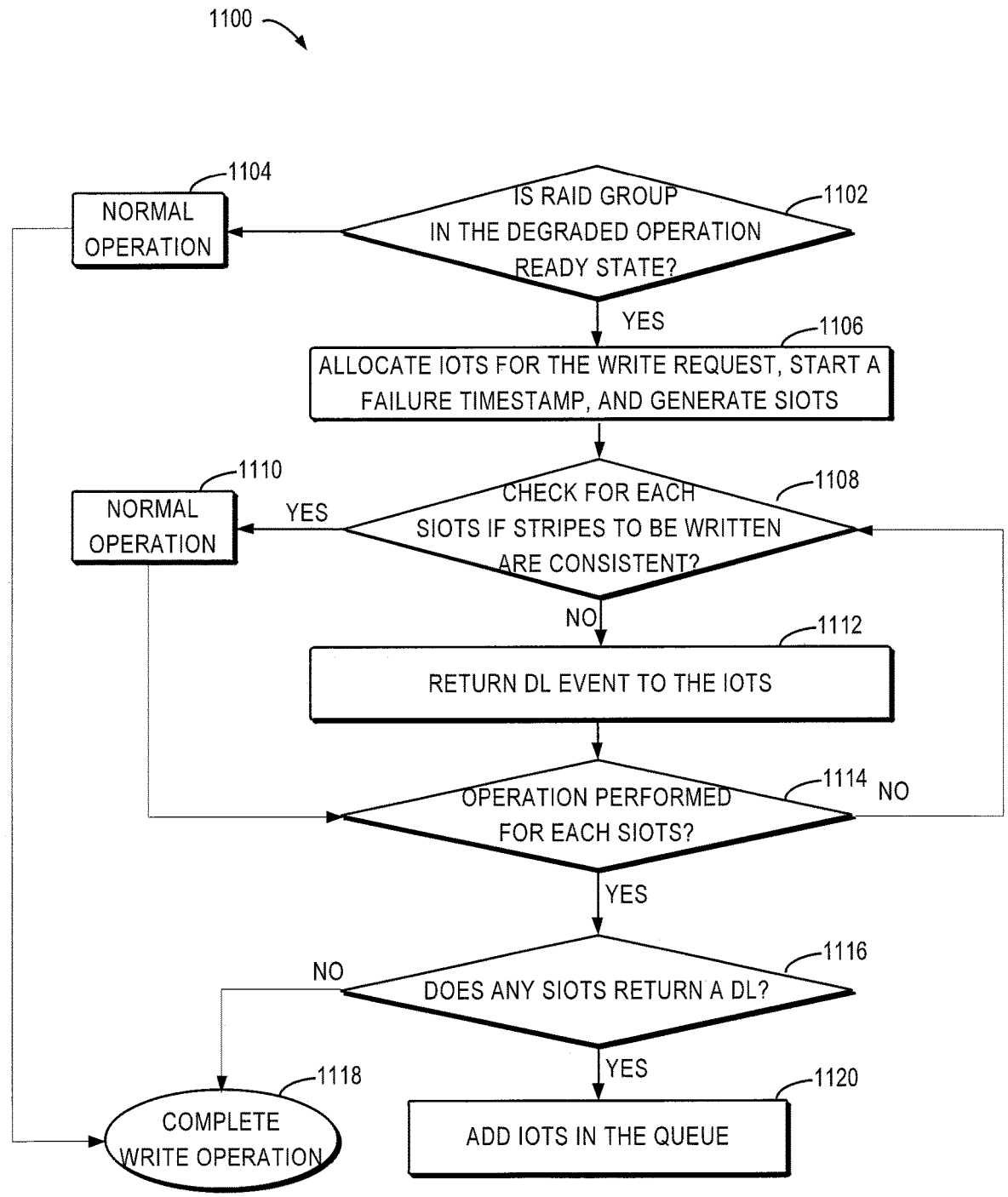
FIG. 11 is a flowchart illustrating a process for processing a background verify avoidance (BVA) write request in accordance with an embodiment of the present disclosure.

FIG. 11 is a flowchart illustrating a process 1100 for processing BVA write request in accordance with an embodiment of the present disclosure. The operations of the process 1100 or at least a part thereof may be implemented by the controlling device/controller of the storage system, particularly by a controlling module in the controller for managing a storage device with a lower access speed.

As shown in FIG. 11, first in step 1102, it is determined whether the RAID group is in the degraded operation ready state. If no, the process proceeds to step 1104 in which the BVA request is processed based on normal operations and the write request is completed in step 1118; if yes, process 1100 proceeds to step 1106. In step 1106, IOTS is allocated for the write request, a failure timestamp is started, the IOTS is transmitted to the RAID library and SIOTS is generated. Next, at 1108, it is checked for each SIOTS if the stripes to be written are consistent. If yes, then process 1100 proceeds to step 1110 in which the processing is performed based on normal writing operations, and the process proceeds to step 1114 after the operation is completed; if no, the process 1100 proceeds to step 1112 in which a DL event is returned to the IOTS, and proceeds to step 1114. In step 1114, it is determined whether the operation is already performed for each SIOTS and if no, the process returns to step 1108 and the next cycle is performed; if yes, the process 1100 proceeds to step 1116. In step 1116, it is determined whether there is any SIOTS that returns the DL event, and if no, the write operation is completed in step 1118 and if yes, the IOTS is added to the queue in step 1120.

Figure 12:
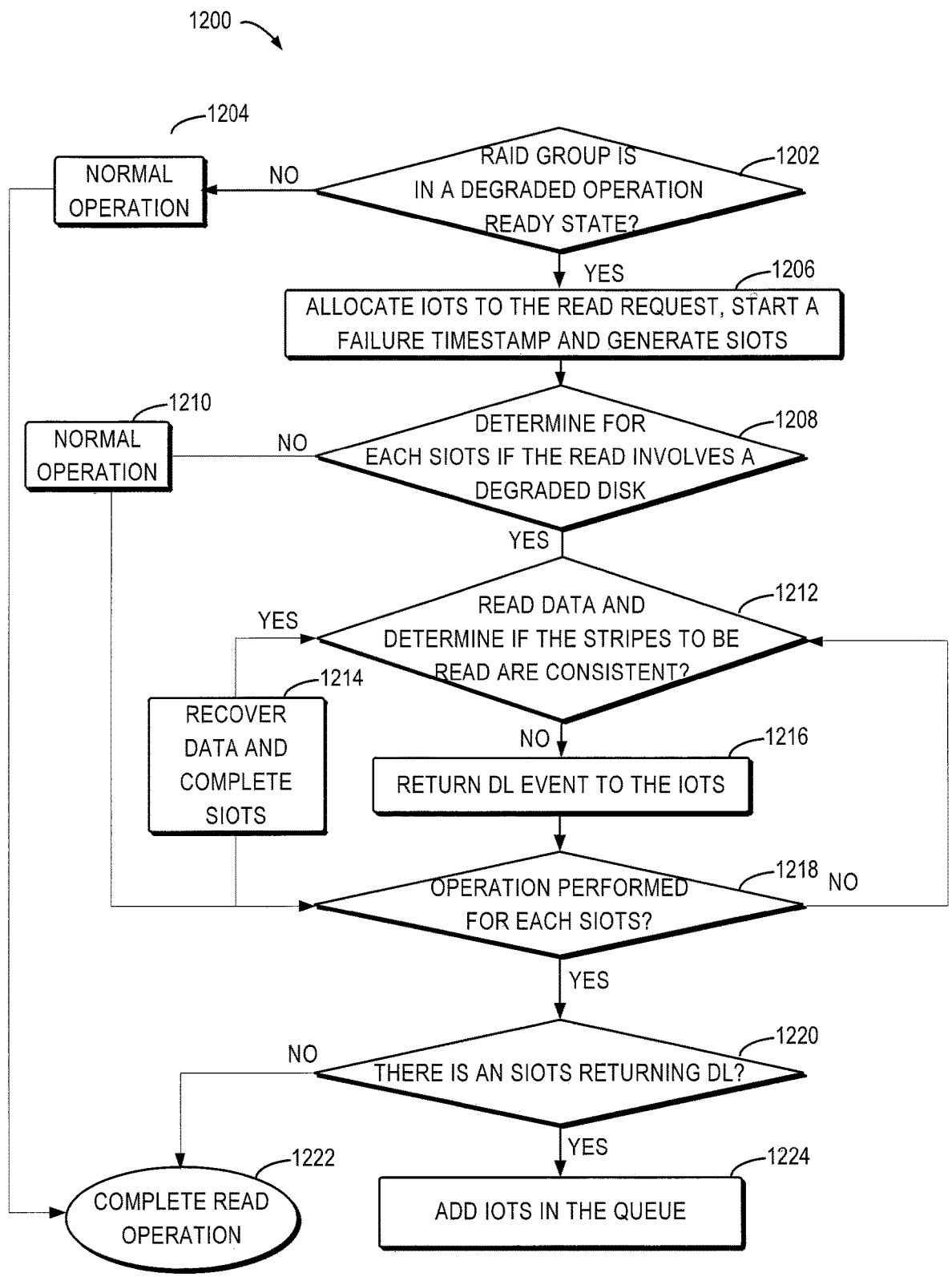
FIG. 12 is a flowchart illustrating a process for processing a read request in accordance with an embodiment of the present disclosure.

FIG. 12 is a flowchart illustrating a process 1200 for processing a read request in accordance with an embodiment of the present disclosure. The operations of the process 1200 or at least a part thereof may be implemented by the controlling device/controller of the storage system, particularly by a controlling module in the controller for managing a storage device with a lower access speed.

As shown in FIG. 12, first, in step 1202, upon receipt of a read request from the user, it is determined whether the RAID group is in the degraded operation ready state. If no, the process proceeds to step 1204 in which the read request is processed based on normal operations, and the read operation is completed in step 1222; if yes, the process 1200 proceeds to the step 1206. In step 1206, the IOTS is allocated for the read request, a failure timestamp is started, the IOTS is transmitted to the RAID library and SIOTS is generated. Next, in step 1208, for each SIOTS, it is determined whether the read operation involves a degraded disk. If no, the process 1200 proceeds to 1210 in which the processing is performed based on normal operations, and proceeds to step 1218 after the operation is completed; if it involves the degraded disk, the process 1200 proceeds to 1212 in which the data is read and it is determined whether the read stripes are consistent. If yes, then the process 1200 proceeds to step 1214 in which RAID algorithm is used to recover data in the degraded disk, and proceeds to step 1218 after the SIOTS is completed; if the stripes are inconsistent, then process 1200 proceeds to step 1216 where the DL event is returned to the IOTS, and then proceeds to step 1218. In step 1218, it is determined if operation is performed for each SIOTS, and if no, the process returns to step 1212 and the next cycle is performed; if yes, the process 1200 proceeds to step 1220. In step 1220, it is determined if there is any SIOTS returning a DL event. If no, the read operation is completed in step 1222 and if yes, the IOTS is added to the queue.

Figure 13:
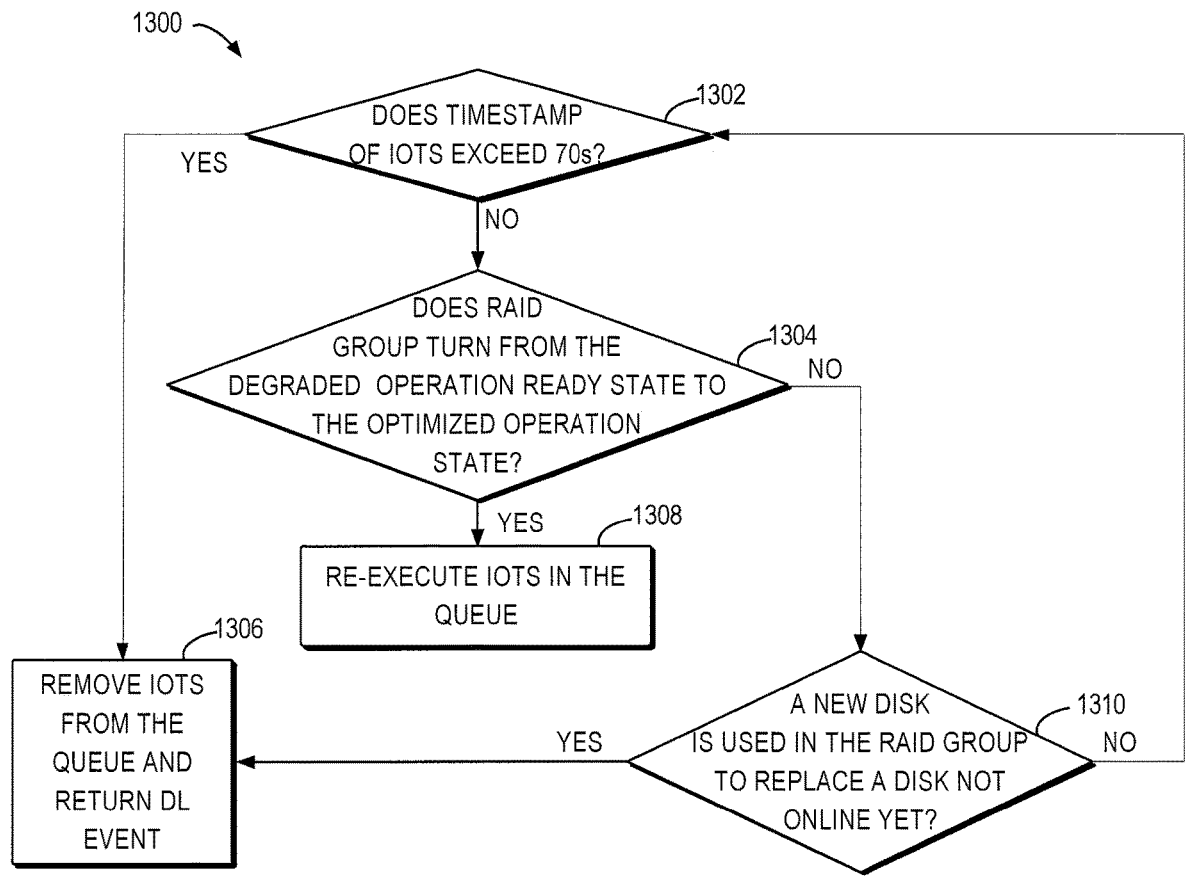
FIG. 13 is a flowchart illustrating a process of I/O waiting time monitoring during failure recovery in accordance with an embodiment of the present disclosure.

FIG. 13 is a flowchart illustrating a process 1300 for I/O waiting time length monitoring during failure recovery in accordance with an embodiment of the present disclosure. As shown in FIG. 13, in step 1302, it is determined if the timestamp of the IOTS exceeds 70 s and if it has exceeded, then process 1300 proceeds to step 1306 in which IOTS is removed from the queue and a DL event is returned to the high level; if no, the process 1300 proceeds to step 1304. In step 1304, it is determined whether the RAID group changes from the degraded operation ready state into the optimized operation state, namely, if all the disks become online. If yes, then process 1300 proceeds to step 1308, in which IOTS is taken from the queue and is executed again; if no, the process proceeds to 1310. In step 1310, it is determined if a disk still not online in the RAID group is replaced with a new disk. If yes, process 1300 proceeds to step 1306; otherwise, the process returns to 1302 and waits for the next timestamp check moment to perform the next cycle.

Figure 14:
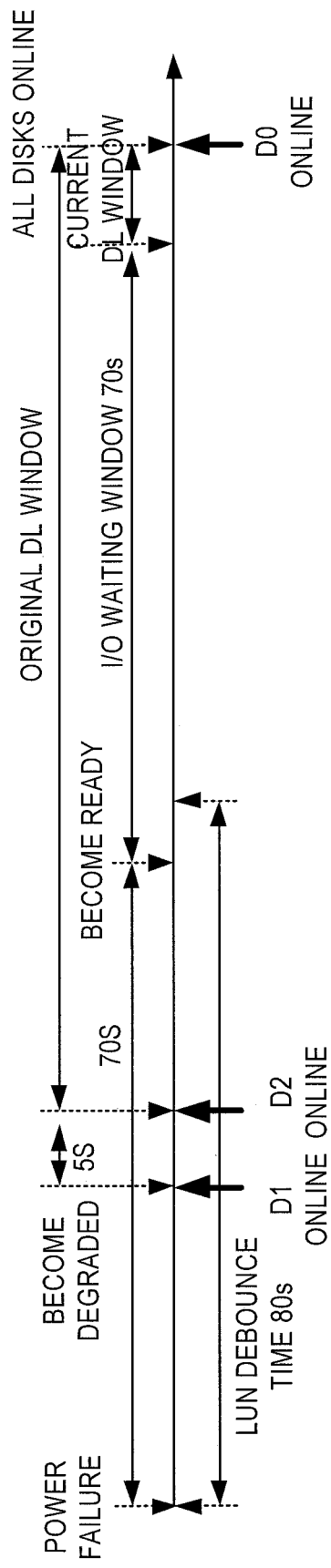
FIG. 14 is a schematic diagram illustrating a DL window during failure recovery in accordance with an embodiment of the present disclosure and a DL window during failure recovery in the prior art.

Therefore, in accordance with embodiments of the present disclosure, it is possible to avoid a DL event during the predetermined ready time limit and/or the predetermined I/O waiting time length limit while avoiding the occurrence of DU, which may reduce the possibility of the occurrence of the DL event. FIG. 14 illustrates a DL window during a process of failure recovery in accordance with an embodiment of the present disclosure and a DL window during a process of failure recovery in the prior art. It can be seen clearly from the figure that in embodiments of the present disclosure, even if in the worst case, it is possible to avoid DL events within a period of 140 s and the DL window opens from the end of the I/O waiting time and closes till the third disk is online. Thus, compared with the original DL window which opens 5 s after the second disk is online until the third disk is online, the DL window of the present disclosure is reduced significantly.

Figure 15:
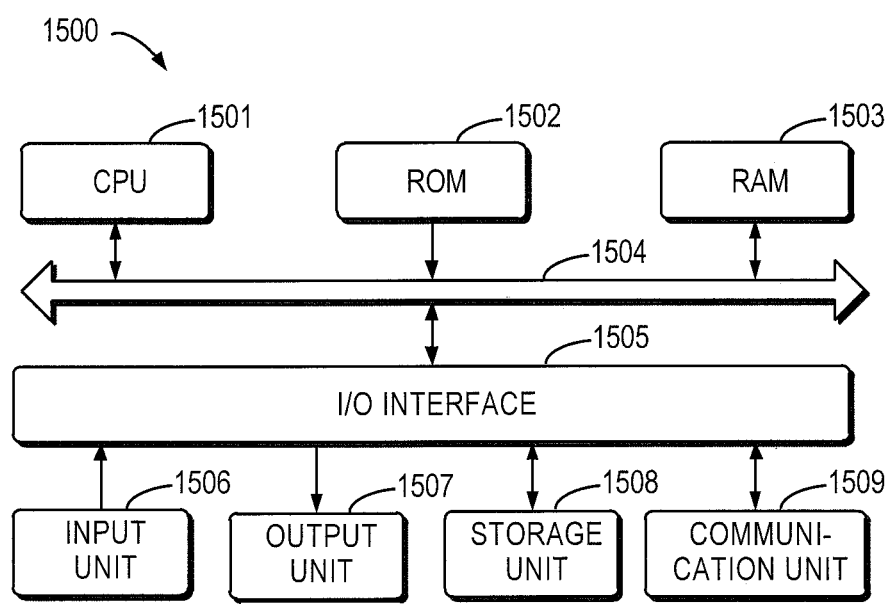
FIG. 15 is a block diagram illustrating an example device that may be used to implement embodiments of the present disclosure.

FIG. 15 is a schematic block diagram illustrating an example device 1500 that may be used to implement embodiments of the present disclosure. One or more of controlling modules of the storage controller 110 shown in FIG. 1 can be implemented by the device 1500. As illustrated, the device 1500 includes a central processing unit (CPU) 1501 which can perform various appropriate actions and processing based on the computer program instructions stored in a read-only memory (ROM) 1502 or computer program instructions loaded into a random access memory (RAM) 1503 from a storage unit 1508. The RAM 1503 also stores various types of programs and data required by operating the storage device 1500. CPU 1501, ROM 1502 and RAM 1503 are connected to each other via a bus 1504 to which an input/output (I/O) interface 1505 is also connected.

Various components in the device 1500 are connected to the I/O interface 1505, including: an input unit 1506, such as keyboard, mouse and the like; an output unit 1507, such as various types of displays, loudspeakers and the like; a storage unit 1508, such as magnetic disk, optical disk and the like; and a communication unit 1509, such as network card, modem, wireless communication transceiver and the like. The communication unit 1509 enables the device 1500 to exchange information/data with other devices via computer networks such as Internet and/or various telecommunication networks.

The processing unit 1501 performs various methods and processes as described above, such as any one of method 500, method 600, method 900, process 1100, process 1200 and process 1300. For example, in some embodiments, any one of the method 500, 600, 900, and process 1100, 1200 and 1300 can be implemented as computer software programs or computer program products, which are tangibly included in a machine-readable medium, such as the storage unit 1508. In some embodiments, the computer program can be partially or completely loaded and/or installed to the device 1500 via the ROM 1502 and/or the communication unit 1509. When the computer program is loaded to the RAM 1503 and executed by the CPU 1501, one or more steps of the above described method 500, method 600, method 900, process 1100, process 1200 and process 1300 can be implemented. Alternatively, in other embodiments, CPU 1501 may be configured to implement any one of the method 500, method 600, method 900, process 1100, process 1200 and process 1300 in any other proper manner (for instance, by means of a firmware).

Those skilled in the art would understand that various steps of the method of the present disclosure above may be implemented via a general-purpose computing device, which may be integrated on a single computing device or distributed over a network including a plurality of computing devices. Optionally, they may be implemented using program codes executable by the computing device, such that they may be stored in a storage device and executed by the computing device; or they may be made into respective integrated circuit modules or a plurality of modules or steps thereof may be implemented by manufacturing them into a single integrated circuit module. In this way, the present disclosure is not limited to any specific combination of hardware and software.

It would be appreciated that although several means or sub-means of the apparatus have been mentioned in detailed description above, such partition is only an example but not limitation. Actually, according to the embodiments of the present disclosure, features and functions of two or more apparatuses described above may be embodied in a single one apparatus. In turn, features and functions of one apparatus described above may be further partitioned to be embodied by multiple apparatuses.

The embodiments described above are only some optional embodiments of the present disclosure and are not for limiting the present disclosure. For those skilled in the art, various alternations and changes can be made to the present disclosure. Any modifications, equivalents and improvements within the spirits and principles of the present disclosure should fall within the scope of the present disclosure.

We claim:

1. A method for failure recovery of a storage system, comprising:
   in response to detecting that a disk group of a memory system failed, recording failure duration of the disk group; and
   maintaining the disk group in a degraded but not ready state if the failure duration does not reach a predetermined ready time limit and the disk group is in a degraded state, wherein the predetermined ready time limit is shorter than a logic unit number debounce time limit to avoid a data unavailable event.

2. The method according to claim 1, further comprising:
   if the disk group is still in the degraded state when the failure duration reaches the predetermined ready time limit, causing the disk group to enter a degraded operation ready state in which the disk group is allowed to be accessed in a degraded mode.

3. The method according to claim 1, further comprising:
   in response to detecting that the disk group has recovered completely, causing the disk group to enter an optimized operation state.

4. The method according to claim 2, further comprising:
   recording an I/O waiting time length in response to an input/output (I/O) request for the disk group if the disk group is in the degraded operation ready state, and
   storing an I/O operation involving inconsistent data in a queue temporarily instead of returning a data loss event directly if the I/O waiting time length does not exceed a predetermined I/O waiting time length limit, wherein the predetermined I/O waiting time length limit is shorter than an I/O operation return time limit to avoid an I/O timeout event.

5. The method according to claim 4, further comprising:
   returning the I/O operation stored in the queue to be implemented again upon detection of the disk group entering an optimized operation state, if the I/O waiting time length does not exceed the predetermined I/O waiting time length limit.

6. The method according to claim 4, further comprising:
   removing the I/O operation from the queue and returning a data loss event when the I/O waiting time length reaches the predetermined I/O waiting time length limit but the disk group does not return to the optimized operation state yet.

7. The method according to claim 4, further comprising:
   in response to detecting that a disk not yet online in the disk group is replaced with a new disk, removing the I/O operation from the queue and returning a data loss event.

8. The method according to claim 7, wherein the predetermined ready time limit is shorter than the logic unit number debounce time limit by 5 to 25 seconds.

9. The method according to claim 8, wherein the predetermined ready time limit is shorter than the logic unit number debounce time limit by 10 seconds.

10. The method according to claim 7, wherein the predetermined I/O waiting time length limit is shorter than the I/O operation return time limit by 5 to 25 seconds.

11. The method according to claim 10, wherein the predetermined I/O waiting time length limit is shorter than the I/O operation return time limit by 10 seconds.

12. An apparatus for failure recovery of a storage system, comprising:
    a processor; and
    a memory coupled to the processor, the memory having instructions stored therein which, when executed by the processor, cause the apparatus to perform acts comprising:
    in response to detecting that a group disk of a memory system failed, recording failure duration of the disk group; and
    maintaining the disk group in a degraded but not ready state, if the failure duration does not reach a predetermined ready time limit and the disk group is in a degraded state, wherein the predetermined ready time limit is shorter than a logic unit number debounce time limit to avoid a data unavailable event.

13. The apparatus according to claim 12, the acts further comprising:
    if the disk group is still in the degraded state when the failure duration reaches the predetermined ready time limit, causing the disk group to enter a degraded operation ready state in which the disk group is allowed to be accessed in a degraded mode.

14. The apparatus according to claim 12, the acts further comprising:
   in response to detecting that the disk group has recovered completely, causing the disk group to enter an optimized operation state.

15. The apparatus according to claim 13, further comprising:
   recording an I/O waiting time length in response to an input/output (I/O) request for the disk group if the disk group is in the degraded operation ready state, and
   storing an I/O operation involving inconsistent data in a queue temporarily instead of returning a data loss event directly if the I/O waiting time length does not exceed a predetermined I/O waiting time length limit, wherein the predetermined I/O waiting time length limit is shorter than an I/O operation return time limit to avoid an I/O timeout event.

16. The apparatus according to claim 15, the acts further comprising:
   returning the I/O operation stored in the queue to be implemented again upon detection of the disk group entering an optimized operation state, if the I/O waiting time length does not exceed the predetermined I/O waiting time length limit.

17. The apparatus according to claim 15, the acts further comprising:
   removing the I/O operation from the queue and returning a data loss event to a higher layer if the disk group does not return to the optimized operation state yet when the I/O waiting time length reaches the predetermined I/O waiting time length limit.

18. The apparatus according to claim 15, the acts further comprising:
   in response to detecting that a disk not yet online in the disk group is replaced with a new disk, removing the I/O operation from the queue and returning a data loss event.

19. The apparatus according to claim 18, wherein the predetermined ready time limit is shorter than the logic unit number debounce time limit by 5 to 25 seconds.

20. The apparatus according to claim 19, wherein the predetermined ready time limit is shorter than the logic unit number debounce time limit by 10 seconds.

21. The apparatus according to claim 18, wherein the predetermined I/O waiting time length limit is shorter than the I/O operation return time limit by 5 to 25 seconds.

22. The apparatus according to claim 21, wherein the predetermined I/O waiting time length limit is shorter than the I/O operation return time limit by 10 seconds.

23. A computer program product having a non-transitory computer readable medium which stores a set of instructions for failure recovery of a storage system; the set of instructions, when carried out by computerized circuitry of the storage system, causing the computerized circuitry to perform a method of:
   in response to detecting that a disk group of a memory system failed, recording failure duration of the disk group; and
   maintaining the disk group in a degraded but not ready state if the failure duration does not reach a predetermined ready time limit and the disk group is in a degraded state, wherein the predetermined ready time limit is shorter than a logic unit number debounce time limit to avoid a data unavailable event.

* * * * *